(12) United States Patent
Knights et al.

(10) Patent No.: US 7,235,315 B2
(45) Date of Patent: Jun. 26, 2007

(54) ELECTROCHEMICAL FUEL CELL STACK HAVING A PLURALITY OF INTEGRATED VOLTAGE REVERSAL PROTECTION DIODES

(75) Inventors: Shanna D Knights, Burnaby (CA); Jacob W De Vaal, Coquitlam (CA); Michael V Lauritzen, Burnaby (CA); David P Wilkinson, North Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 736 days.

(21) Appl. No.: 10/737,540

(22) Filed: Dec. 16, 2003

(65) Prior Publication Data

US 2005/0129988 A1    Jun. 16, 2005

(51) Int. Cl.
*H01M 8/04* (2006.01)
*H01M 8/10* (2006.01)
(52) U.S. Cl. .............................. 429/7; 429/23; 429/24; 429/35; 429/38
(58) Field of Classification Search ..................... None
See application file for complete search history.

(56) References Cited

U.S. PATENT DOCUMENTS

| 6,555,260 B2 * | 4/2003 | Aberle et al. ................. 429/26 |
| 6,838,199 B2 * | 1/2005 | Balliet et al. ................. 429/13 |
| 2002/0009624 A1 | 1/2002 | Aberle et al. ................. 429/26 |
| 2004/0099907 A1 * | 5/2004 | Morimoto et al. .......... 257/341 |

FOREIGN PATENT DOCUMENTS

| WO | WO 00/41260 | 7/2000 |
| WO | WO 00/49673 | 8/2000 |
| WO | WO 01/15247 A2 | 3/2001 |
| WO | WO 01/15249 A2 | 3/2001 |

* cited by examiner

*Primary Examiner*—John S. Maples
(74) *Attorney, Agent, or Firm*—Seed IP Law Group PLLC

(57) ABSTRACT

An electrochemical fuel cell stack comprises a plurality of fuel cell assemblies, wherein, each fuel cell assembly comprises a cell compressed between a pair of flow field plates, a perimeter seal circumscribing the cell and interposed between the pair of flow field plates, and a first diode, having an aspect ratio greater than 10:1, positioned adjacent to, and outside of, the perimeter seal along a first edge of the cell and interposed between the pair of flow field plates.

13 Claims, 3 Drawing Sheets

ELECTROCHEMICAL FUEL CELL STACK HAVING A PLURALITY OF INTEGRATED VOLTAGE REVERSAL PROTECTION DIODES

BACKGROUND OF THE INVENTION

1. Field of the Invention

This invention relates generally to electrochemical fuel cell stacks. More specifically, the present invention relates to electrochemical fuel cell stacks comprising a plurality of fuel cell assemblies having integrated diodes.

2. Description of the Related Art

Fuel cell systems are currently being developed for use as power supplies in a wide variety of applications, such as automobiles and stationary power plants. Such systems offer the promise of delivering power economically while providing environmental and other benefits. To be commercially viable, however, fuel cell systems should exhibit adequate reliability in operation, even when the fuel cells are subjected to conditions outside their preferred operating ranges.

Fuel cells convert reactants, namely, fuel and oxidant, to generate electric power and reaction products. Fuel cells generally employ an electrolyte disposed between two electrodes, namely a cathode and an anode. A catalyst typically induces the desired electrochemical reactions at the electrodes. Fuel cell types include alkaline fuel cells and solid polymer electrolyte (SPE) fuel cells, which comprise a solid polymer electrolyte and operate at relatively low temperatures.

SPE fuel cells employ a membrane electrode assembly (MEA), which comprises the solid polymer electrolyte or ion-exchange membrane disposed between the two electrodes. Each electrode contains a catalyst layer, comprising an appropriate catalyst for facilitating the desired electrochemical reaction of the fuel and oxidant, located adjacent to the solid polymer electrolyte membrane. The catalyst is typically a precious metal composition (e.g., platinum metal black or an alloy thereof) and may be provided on a suitable support (e.g., fine platinum particles supported on a carbon black support). The catalyst layers may contain an ionomer similar to that used for the solid polymer electrolyte membrane (e.g., Nafion®). The electrodes may also contain a porous, electrically conductive substrate that may be employed for purposes of mechanical support, electrical conduction, and/or reactant distribution, thus serving as a fluid diffusion layer. Separator or flow field plates, for directing the reactants across one surface of each electrode or electrode substrate, are disposed on each side of the MEA.

A broad range of reactants can be used in SPE fuel cells. For example, the fuel stream may be substantially pure hydrogen gas, a gaseous hydrogen-containing reformate stream, or methanol in a direct methanol fuel cell. The oxidant may be, for example, substantially pure oxygen or a dilute oxygen stream such as air.

During normal operation of a SPE fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The electrons travel through an external circuit providing useable power and then react with the protons and oxidant at the cathode catalyst to generate water reaction product.

In operation, the output voltage of an individual fuel cell under load is generally below one volt. Therefore, in order to provide greater output voltage, multiple cells are usually stacked together and are connected in series to create a higher voltage fuel cell stack. End plate assemblies are placed at each end of the stack to hold the stack together and to compress the stack components together, thereby sealing and providing adequate electrical contact between various stack components. Fuel cell stacks can be further connected in series and/or parallel combinations to form larger arrays for delivering higher voltages and/or currents.

Electrochemical fuel cells are occasionally subjected to a voltage reversal condition, which is a situation in which the cells are forced to the opposite polarity. Opposite polarity may be deliberately induced, as in the case of certain electrochemical devices known as regenerative fuel cells. However, power-producing electrochemical fuel cells connected in series are potentially subject to unwanted voltage reversals, as is the case when one of the cells is forced to the opposite polarity by the other cells in the series. In fuel cell stacks, this can occur when a cell is unable to produce, from the normal electrochemical reactions occurring within it, the current being produced by the remainder of the cells in the stack and being directed through the affected cell by virtue of its being in series with the remainder of the cells. In addition, groups of cells within a stack can undergo voltage reversal and even entire stacks can be driven into voltage reversal by other stacks in an array.

Aside from the loss of power associated with one or more cells going into voltage reversal, this situation poses durability and reliability concerns as well. Undesirable electrochemical reactions may occur, which may detrimentally affect, or degrade, fuel cell components. For example, when there is an inadequate supply of fuel (e.g., fuel starvation due to water flooding at the anode, fuel supply problems, and the like) to a SPE fuel cell, there can be a rise in the absolute potential of the fuel cell anode leading to the electrolysis of water present at the anode and oxidation (e.g., corrosion) of the anode components. Such component degradation reduces the reliability and performance of the affected fuel cell, and in turn, its associated stack and array. Sufficiently high voltages on the anode can also lead to electrical shorting in the cell. The membrane electrolyte with its relatively high resistance is heated when such a high voltage is applied across the cell. With sufficient heating, the membrane melts resulting in the formation of holes and shorting of the cell. As disclosed in International Publication Nos. WO 01/15247 and WO 01/15249, a SPE fuel cell can be made more tolerant to voltage reversal by incorporating an additional catalyst at the anode to promote the electrolysis of water and/or by enhancing the presence of water at the anode through modifications to the anode structure. In these ways, more of the current forced through the cell may be consumed by the electrolysis of water than by the oxidation of the anode components.

In addition, adverse effects of voltage reversal may be prevented, for instance, by connecting diodes, capable of carrying the stack current, across each individual fuel cell (as disclosed in International Publication No. WO 00/49673) or by monitoring the voltage of each individual fuel cell and shutting down an affected stack if a low cell voltage is detected. However, since fuel cell stacks typically employ numerous fuel cells, such approaches can be quite complex and expensive to implement.

Accordingly, although there have been advances in the field, there remains a need for improved methods of protecting fuel cells from the adverse effects of voltage reversal conditions. The present invention addresses these needs and provides further related advantages.

BRIEF SUMMARY OF THE INVENTION

In brief, the present invention relates to electrochemical fuel cell stacks comprising a plurality of fuel cell assemblies having integrated diodes.

In one embodiment, a fuel cell stack is provided that comprises a plurality of fuel cell assemblies, wherein each fuel cell assembly comprises a cell compressed between a pair of flow field plates, a perimeter seal circumscribing the cell and interposed between the pair of flow field plates, and a first diode, having an aspect ratio greater than 10:1, positioned adjacent to, and outside of, the perimeter seal along a first edge of the cell and interposed between the pair of flow field plates.

In a further embodiment, each fuel cell assembly further comprises a second diode, having an aspect ratio greater than 10:1, positioned adjacent to, and outside of, the perimeter seal along a second edge of the cell and interposed between the pair of flow field plates.

In other further embodiments, the pair of flow field plates comprises coolant channels adjacent to at least one of the first and second diodes.

In yet a further embodiment, each fuel cell assembly further comprises an internal manifold opening passing through the cell, an internal manifold seal circumscribing the internal manifold opening and compressed between the pair of flow field plates, and an internal diode, having an aspect ratio greater than 10:1, positioned between the internal manifold seal and the internal manifold opening and interposed between the pair of flow field plates.

In more specific embodiments of the above, the plurality of fuel cell assemblies is a plurality of solid polymer electrolyte fuel cell assemblies and the cell of each solid polymer electrolyte fuel cell assembly is a membrane electrode assembly.

These and other aspects of the invention will be apparent upon reference to the attached figures and following detailed description.

BRIEF DESCRIPTION OF THE SEVERAL VIEWS OF THE DRAWING(S)

DETAILED DESCRIPTION OF THE INVENTION

Figure 1:
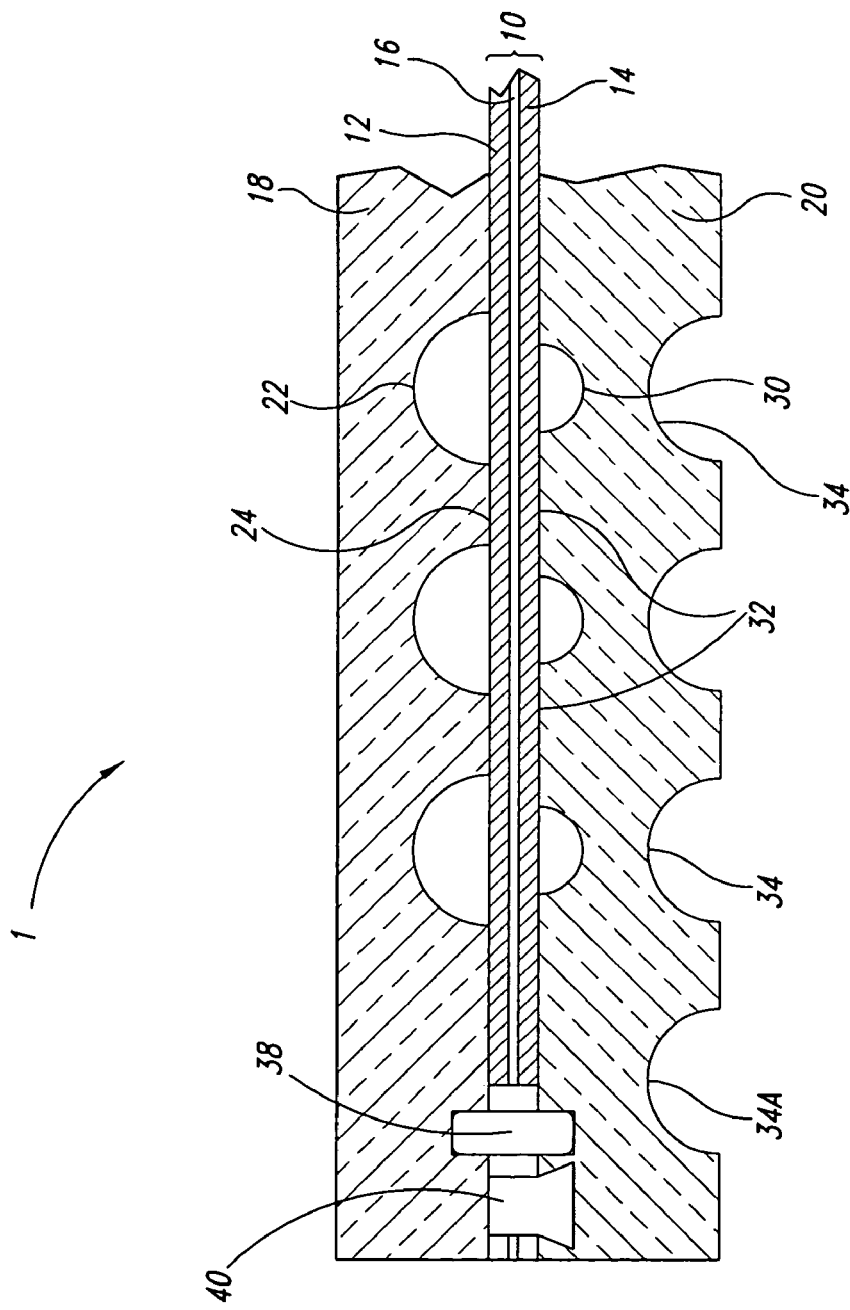
FIG. 1 is a partial cross-sectional view of a fuel cell assembly comprising a cell, a perimeter seal and a diode interposed between a pair of flow field plates.

FIG. 1 is a partial cross-sectional view of a fuel cell assembly comprising an integrated voltage reversal protection diode. Cell 10 comprises a cathode 12, an anode 14, and an electrolyte 16 interposed therebetween. Cell 10 is interposed between oxidant flow field plate 18 and fuel flow field plate 20 to form fuel cell assembly 1. Oxidant channels 22, separated by land areas 24, are formed in the surface of oxidant flow field plate 18 which faces cell 10. Similarly, fuel channels 30, separated by land areas 32, are formed in the surface of fuel flow field plate 20 which faces cell 10.

In a more specific embodiment, fuel cell assembly 1 is a solid polymer electrolyte fuel cell assembly, cell 10 is a membrane electrode assembly (MEA) and electrolyte 16 is a solid polymer electrolyte or ion-exchange membrane.

As shown in FIG. 1, perimeter seal 38 circumscribes cell 10 and is interposed between the pair of flow field plates, namely, oxidant flow field plate 18 and fuel flow field plate 20. Perimeter seal 38 may be a die-cut elastomer, moulded-in-place silicone rubber, silicone-based elastomer, or epoxy-based glue that cooperates with flow field plates 18 and 20 when compressed to form a fluid seal.

Diode 40 is positioned adjacent to, and outside of, perimeter seal 38 along the edge of cell 10. Similar to perimeter seal 38, diode 40 is interposed between the pair of flow field plates and cooperates with the flow field plates when compressed to form an electrical connection across (i.e., in parallel to) cell 10. Diode 40 may be a metal-encapsulated silicon or germanium-based semiconductor device glued in place with conductive cement, or installed in stamped indentations or grooves in the plates and supported by small conductive metal springs.

As shown in FIG. 1, diode 40 is integrated into flow field plate 20 and forms a direct electrical connection with adjacent flow field plate 18. (Alternatively, diode 40 may be integrated into flow field plate 18 and form a direct electrical connection with adjacent flow field plate 20.) Accordingly, it is possible to dispense with additional components, such as bus bars and connecting cables, necessary to form an electrical connection between a non-integrated diode and the corresponding fuel cell assembly. In this way, a fuel cell stack comprising a plurality of fuel cell assemblies 1, each having an integrated diode 40, achieves a significant weight, cost, volume and design advantage over fuel cell stacks employing non-integrated diodes, such as fuel cell stacks having a plurality of externally connected diodes.

As further shown in FIG. 1, fuel flow field plate 20 may also have coolant channels 34 formed in the surface of fuel flow field plate 20 which is opposite cell 10. Alternatively, coolant channels 34 may be formed in the surface of oxidant flow field plate 20 which is opposite cell 10. As illustrated, at least one coolant channel (e.g., coolant channel 34A in FIG. 1) may be located adjacent to diode 40 to facilitate cooling.

During operation, and during periods when the absolute potential of anode 14 rises (e.g., during voltage reversal conditions), the electrical current is shunted around the failing cell and passes through diode 40. In this way, the current passing through cell 10 is reduced and the damage suffered by anode 14 is minimized. During periods of normal operation, only a very small leakage current passes through diode 40.

The blocking voltage of diode 40 will depend on the selection of the diode material. For example, silicon junction devices typically have a threshold voltage of about 0.7 V, germanium-based diodes typically have a threshold voltage of about 0.3 V and Schottky diodes typically have a threshold voltage of about 0.2–0.3 V.

The location of diode 40 in fuel cell assembly 1 has a significant impact on the performance of diode 40 in protecting cell 10 from significantly negative voltages. For example, the direct electrical connection between diode 40 and flow field plates 18 and 20 minimizes the ohmic drop between the source of current and diode 40. In this way, the amount of current carried by diode 40 is maximized and the current passing through the active area of cell 10 is minimized.

In addition, the operating characteristics of diode 40 are affected by temperature. At high temperatures (e.g., greater than about 150° C.), diode 40 will conduct at a lower forward voltage, thereby offering more protection to cell 10. However, such temperatures may eventually result in damage to diode 40 and to other cell components. The design of the cooling system (e.g., liquid coolant or air cooling) will therefore be an important factor in the integration of diode 40 into fuel cell assembly 10. For example, the location of diode 40 along the edge of cell 10 permits the addition of coolant channels 34 (e.g., coolant channel 34A) in the areas of flow field plates 18 and 20 adjacent to diode 40, and allows for free or forced-convective liquid or air cooling directed over the outside edge of cell 10. In this way, the high thermal conductivity of flow field plates 18 and 20 and the proximity of diode 40 to coolant channels 34 ensures adequate cooling of diode 40.

Furthermore, the aspect ratio of diode 40 will also impact the performance of diode 40. For example, increases in the aspect ratio decrease the effective distance from any given part of cell 10 to diode 40, further reducing the ohmic drop and, thereby, increasing the effectiveness of the diode installation. Furthermore, increases in the aspect ratio of diode 40 also result in a distribution of the generated heat over a greater area, thereby reducing material failure rates.

Figure 2:
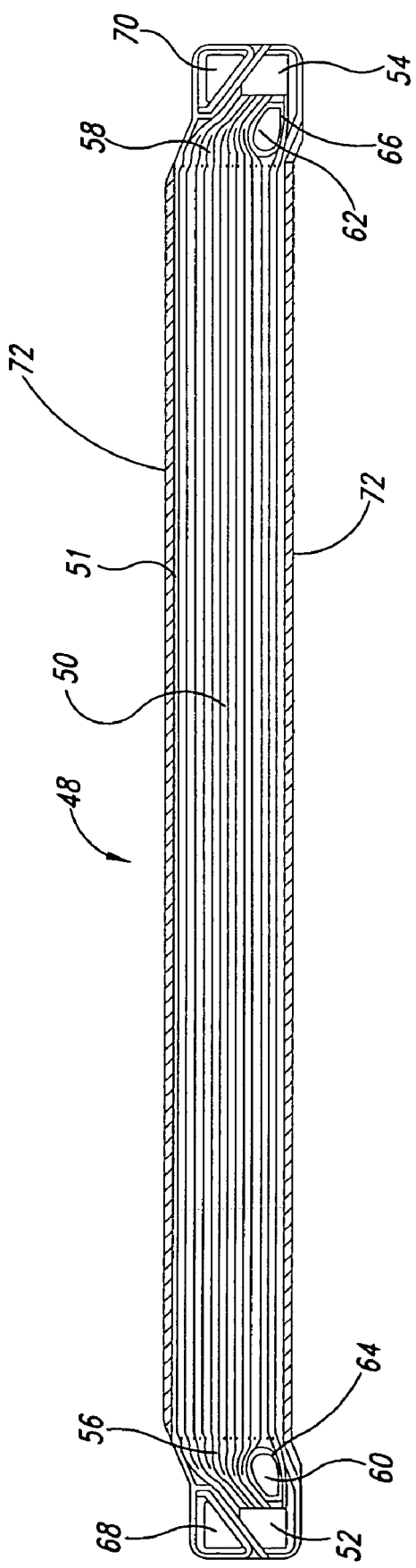
FIG. 2 is a plan view of a representative flow field plate of the fuel cell assembly of FIG. 1.

FIG. 2 is a plan view of a representative flow field plate of the fuel cell assembly of FIG. 1. Flow field plate 48, such as oxidant flow field plate 18 of FIG. 1, comprises a plurality of parallel oxidant channels 50 fluidly connected to oxidant manifold openings 52 and 54 via oxidant passages 56 and 58, respectively. The area defined by oxidant channels 50, and the corresponding separating land areas, is considered the active area (e.g., cell 10 in FIG. 1) of the fuel cell assembly. Flow field plate 48 further comprises fuel manifold openings 60 and 62, and respective fuel manifold seals 64 and 66 for fluidly isolating oxidant passages 56 and 58 from the fuel fluid stream transported through fuel manifold openings 60 and 62, and coolant manifold openings 68 and 70, and respective coolant manifold seals (not specifically shown) to fluidly isolate oxidant passages 56 and 58 from the coolant fluid stream transported through coolant manifold openings 68 and 70.

As shown, perimeter seal 51 circumscribes oxidant channels 50, oxidant passages 56 and 58, oxidant manifold openings 52 and 54, fuel manifold openings 60 and 62 and coolant manifold openings 68 and 70. In the absence of a fluid leak, perimeter seal 51 serves to confine the oxidant fluid to the circumscribed area of flow field plate 48. Diode(s) 72, similar to diode 40 of FIG. 1, are positioned adjacent to, and outside of, perimeter seal 51 and extend along the length of the active area (i.e., along the length of the area defined by oxidant channels 50, and the corresponding separating land areas) on one or both sides of flow field plate 48.

In the embodiment illustrated in FIG. 2, flow field plate 48 has an overall length of about 730 mm and an overall width of about 60 mm. Oxidant channels 50 are about 600 mm in length and, together with the corresponding separating land areas, define an active area of about 300 cm². To handle the electrical current generated (e.g., 300 A), the contact area of diode(s) 72 is, for example, approximately 168 mm². Accordingly, for an active area length of about 600 mm, diode(s) 51 is 0.14 mm wide (aspect ratio greater than 2000:1), if located on both sides of flow field plate 48, or 0.28 mm wide (aspect ratio greater than 1000:1), if located on only one side of flow field plate 48.

Figure 3:
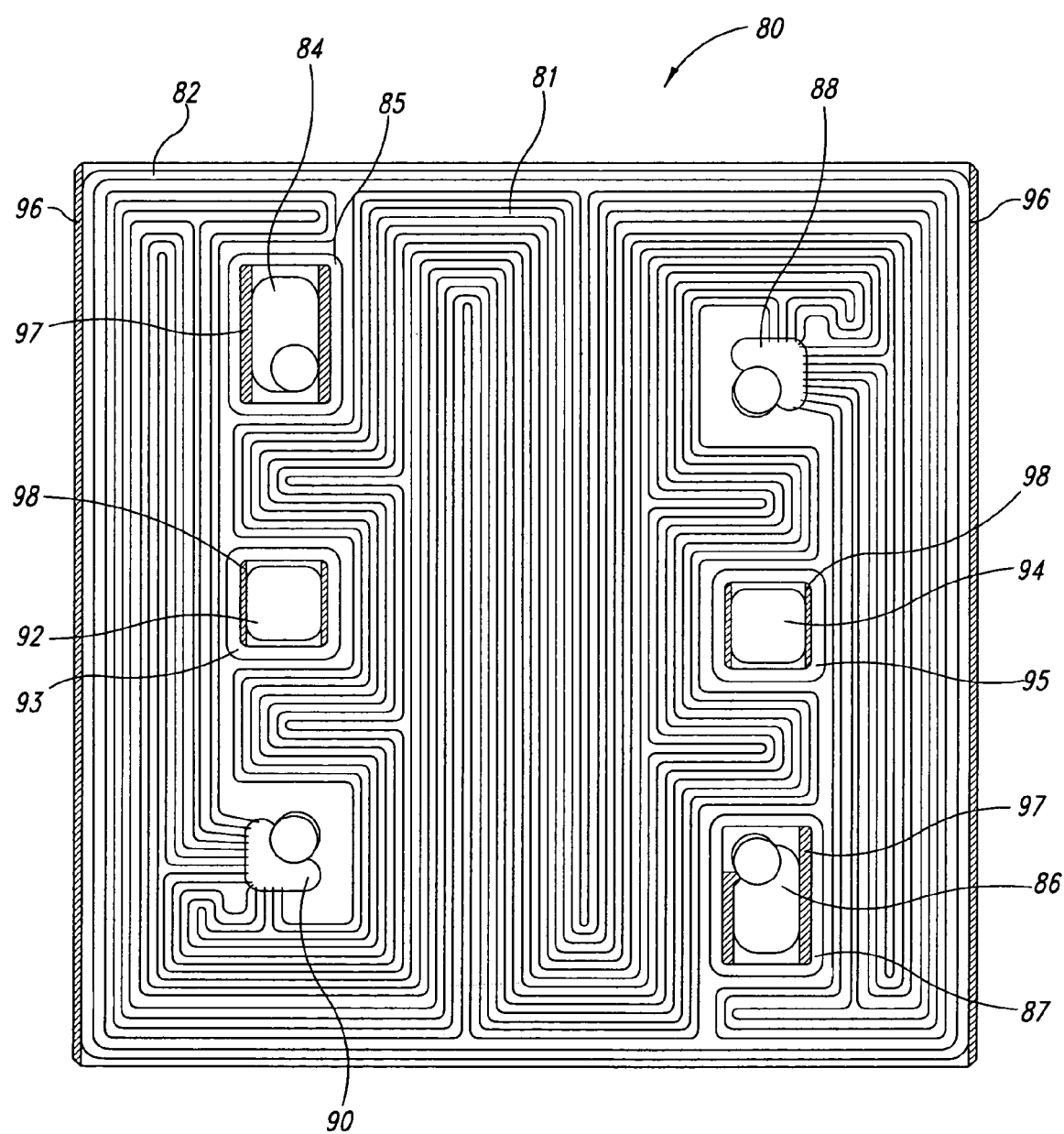
FIG. 3 is a plan view of an alternate representative flow field plate of the fuel cell assembly of FIG. 1.

FIG. 3 is a plan view of an alternate representative flow field plate of the fuel cell assembly of FIG. 1. Flow field plate 80, such as oxidant flow field plate 18 of FIG. 1, comprises a plurality of oxidant channels 81 fluidly connected to internal oxidant manifold openings 88 and 90. As in FIG. 2, the area defined by oxidant channels 81, and the corresponding separating land areas, is considered the active area of the fuel cell assembly. Flow field plate 80 further comprises internal fuel manifold openings 84 and 86, and respective internal fuel manifold seals 85 and 87 for fluidly isolating oxidant channels 81 from the fuel fluid stream transported through internal fuel manifold openings 84 and 86, and internal coolant manifold openings 92 and 94, and respective internal coolant manifold seals 93 and 95 to fluidly isolate oxidant channels 81 from the coolant fluid stream transported through internal coolant manifold openings 92 and 94.

As shown, perimeter seal 82 circumscribes oxidant channels 81 and all the internal manifold openings (i.e., internal oxidant manifold openings 88 and 90, internal fuel manifold openings 84 and 86, and internal coolant manifold openings 92 and 94). In the absence of a fluid leak, perimeter seal 82 serves to confine the oxidant fluid to the circumscribed area of flow field plate 80. Diode(s) 96, similar to diode 40 of FIG. 1, are positioned adjacent to, and outside of, perimeter seal 82 and extend along the length of the active area (i.e., along the length of the area defined by oxidant channels 81, and the corresponding separating land areas) on one or both sides of flow field plate 80.

In the embodiment illustrated in FIG. 3, each side of flow field plate 80 has a length of about 220 mm, thereby defining an active area of about 400 cm². To handle the electrical current generated (e.g., 720 A), the contact area of diode(s) 96 would be, for example, approximately 403 mm². Accordingly, for an active area length of about 220 mm, if two diodes along the active area length, and located on both sides of flow field plate 80, are used, such diodes 96 would be 0.9 mm wide (aspect ratio greater than 200:1). If a single diode is used along one side of the active area length, such diode 96 would be 1.8 mm wide (aspect ratio greater than 100:1).

As further shown in FIG. 3, flow field plate 80 may also comprise one or more internal diode(s) 97 and 98, which are interposed between internal fuel manifold seals 85 and 87 and internal fuel manifold openings 84 and 86 and between internal coolant manifold seals 93 and 95 and internal coolant manifold openings 92 and 94, respectively. To handle the electrical current generated, such internal diode(s) would have an aspect ratio greater than 10:1. For example, given a total active area length of 210 to 320 mm (i.e., the sum of the distances around each of internal fuel manifold openings 84 and 86 and internal coolant manifold openings 92 and 94) and an electrical current of 720 A, internal diode(s) 97 and 98 would be 1.91 to 1.25 mm wide (aspect ratio of 109 to 250).

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A fuel cell stack comprising a plurality of fuel cell assemblies, wherein each fuel cell assembly comprises:
    a cell compressed between a pair of flow field plates;
    a perimeter seal circumscribing the cell and interposed between the pair of flow field plates; and a first diode, having an aspect ratio greater than 10:1, positioned adjacent to, and outside of, the perimeter seal along a first edge of the cell and interposed between the pair of flow field plates.

2. The fuel cell stack of claim 1 wherein:
the plurality of fuel cell assemblies is a plurality of solid polymer electrolyte fuel cell assemblies; and
the cell of each solid polymer electrolyte fuel cell assembly is a membrane electrode assembly.

3. The fuel cell stack of claim 2 wherein the aspect ratio of the first diode is greater than 1000:1.

4. The fuel cell stack of claim 2 wherein the aspect ratio of the first diode is greater than 100:1.

5. The fuel cell stack of claim 1 wherein the pair of flow field plates comprises a coolant channel adjacent to the first diode.

6. The fuel cell stack of claim 1 wherein each fuel cell assembly further comprises a second diode, having an aspect ratio greater than 10:1, positioned adjacent to, and outside of, the perimeter seal along a second edge of the cell and interposed between the pair of flow field plates.

7. The fuel cell stack of claim 6 wherein:
the plurality of fuel cell assemblies is a plurality of solid polymer electrolyte fuel cell assemblies; and
the cell of each solid polymer electrolyte fuel cell assembly is a membrane electrode assembly.

8. The fuel cell stack of claim 7 wherein:
the aspect ratio of the first diode is greater than 2000:1; and
the aspect ratio of the second diode is greater than 2000:1.

9. The fuel cell stack of claim 7 wherein:
the aspect ratio of the first diode is greater than 200:1; and
the aspect ratio of the second diode is greater than 200:1.

10. The fuel cell stack of claim 6 wherein the pair of flow field plates comprises coolant channels adjacent to the first and second diodes.

11. The fuel cell stack of claim 1 or 6 wherein each fuel cell assembly further comprises:
an internal manifold opening passing through the cell;
an internal manifold seal circumscribing the internal manifold opening and compressed between the pair of flow field plates; and
an internal diode, having an aspect ratio greater than 10:1, positioned between the internal manifold seal and the internal manifold opening and interposed between the pair of flow field plates.

12. The fuel cell stack of claim 11 wherein:
the plurality of fuel cell assemblies is a plurality of solid polymer electrolyte fuel cell assemblies; and
the cell of each solid polymer electrolyte fuel cell assembly is a membrane electrode assembly.

13. The fuel cell stack of claim 11 wherein each fuel cell assembly further comprises:
one or more additional internal manifold openings passing through the cell;
one or more additional internal manifold seals circumscribing the one or more additional internal manifold openings and compressed between the pair of flow field plates; and
one or more additional internal diodes, each having an aspect ratio greater than 10:1, positioned between the one or more additional internal manifold seals and the one or more additional internal manifold openings and interposed between the pair of flow field plates.

* * * * *